United States Patent [19]

Blanchard et al.

[11] Patent Number: 6,073,014
[45] Date of Patent: Jun. 6, 2000

[54] METHOD AND SYSTEM FOR DYNAMIC GROUP RADIO USING EXISTING TELEPHONY INFRASTRUCTURE

[75] Inventors: Scott David Blanchard, Mesa; Dean Paul Vanden Heuvel, Chandler; Paul Frederick Dankert, Gilbert, all of Ariz.; Mark Denis Adams, Mannassas, Va.

[73] Assignee: Motorola, Inc., Schaumburg, Ill.

[21] Appl. No.: 08/923,582

[22] Filed: Sep. 4, 1997

[51] Int. Cl.[7] .................................. H03F 3/58; H04B 3/60
[52] U.S. Cl. .......................... 455/428; 455/519; 455/426; 455/427; 455/518
[58] Field of Search ..................................... 455/426, 427, 455/428, 518, 519, 517, 430

[56] References Cited

U.S. PATENT DOCUMENTS

| | | | |
|---|---|---|---|
| 4,654,867 | 3/1987 | Labedz et al. | 455/422 |
| 5,533,098 | 7/1996 | Lee | 455/518 |
| 5,717,830 | 2/1998 | Sigler et al. | 455/426 |
| 5,903,847 | 5/1999 | Heiskari et al. | 455/509 |
| 5,907,794 | 5/1999 | Lehmusto et al. | 455/11.1 |

*Primary Examiner*—Daniel S. Hunter
*Assistant Examiner*—Alan T. Gantt
*Attorney, Agent, or Firm*—Dana B. LeMoine; Frank J. Bogacz

[57] ABSTRACT

A group radio system (10) uses a group radio controller (230) to connect and manage remote units (20–100) through a wireline switched telephony network. The group radio controller receives voice or data from any of the remote units and repeats this to the others who are connected to the group channel. The group radio controller also assigns remote units in communication with the group channel via satellites (300,400) and other remote units also in communication with the group channel via a terrestrial cellular host network (90) to be anchor radios. The use of anchor radios for these types of users significantly lowers the cost to the group for this type of global radio service.

32 Claims, 5 Drawing Sheets

METHOD AND SYSTEM FOR DYNAMIC GROUP RADIO USING EXISTING TELEPHONY INFRASTRUCTURE

TECHNICAL FIELD

This invention relates to satellite communications, and, in particular, to a method and system for establishing and maintaining a group channel that allows one user to talk while others listen.

BACKGROUND OF THE INVENTION

As telephone and communications infrastructure technology has evolved from the basic terrestrial wireline system, to the wireless cellular extension, and to the satellite-based global coverage enhancement, emphasis has been placed on enabling one user to communicate with another user. This communication can take the form of encrypted or unencrypted voice, paging information, audio-visual information, FAX data, and the like. The advancements in the wireless and satellite extensions to the basic wireline system enable users to communicate with each other from increasingly remote locations.

Parallel to these developments, have been advances in trunked radio systems. In a trunked radio system, a computer control unit establishes and manages a group channel which allows one user to talk while others listen. When a user wants to make a transmission, the computer assigns the radio to a transmit channel and assigns the other members of the group to a receive channel. As the trunk station receives transmissions from the users, they are repeated over the shared receive channel to the other members in the group. When the conversation has been completed or after the channel is idle for a period of time, the computer control unit directs the group members to return to a control channel thus allowing the communications channel to be used by another group. Trunked radio systems are used widely in public service sectors, such as police and fire departments, where coordination among several users is necessary to ensure timely and efficient response.

However, trunked systems are expensive to establish and maintain. To establish a group channel, at least one trunking station must be built to enable a line-of-sight communication link with each member in the user group. If the users are spread over a large geographical area, this may entail a network of repeater stations placed at the top of tall buildings, or hills in rural areas. The cost of establishing and maintaining this network can be very high.

Therefore, what is needed is a system that combines the geographical coverage of a global telephony system with the group channel capability of a trunked radio system.

DESCRIPTION OF THE PREFERRED EMBODIMENTS

A satellite-based group radio system provides links to group channels for use by a wide range of business, military, and civil activities operating over a wide geographical area. Satellite linking eliminates the expensive and time-consuming physical siting problems associated with terrestrial communication systems. Additionally, the time required to configure a group radio channel can be minimized through the use of advanced signaling techniques and channel management. These same techniques are employed to reduce the cost to the user. The size of the user group or the geographical area of coverage can be changed quickly and without the need for additional assets, other than the quantity of remote unit communication sets. Since the system makes maximum use of existing telephony infrastructures, terrestrial wireline and terrestrial cellular users can also connect to the group channel. Additionally, existing trunked systems can couple to the group channel through their existing capability to establish a temporary connection (patch) to a wireline telephone system.

Figure 1:
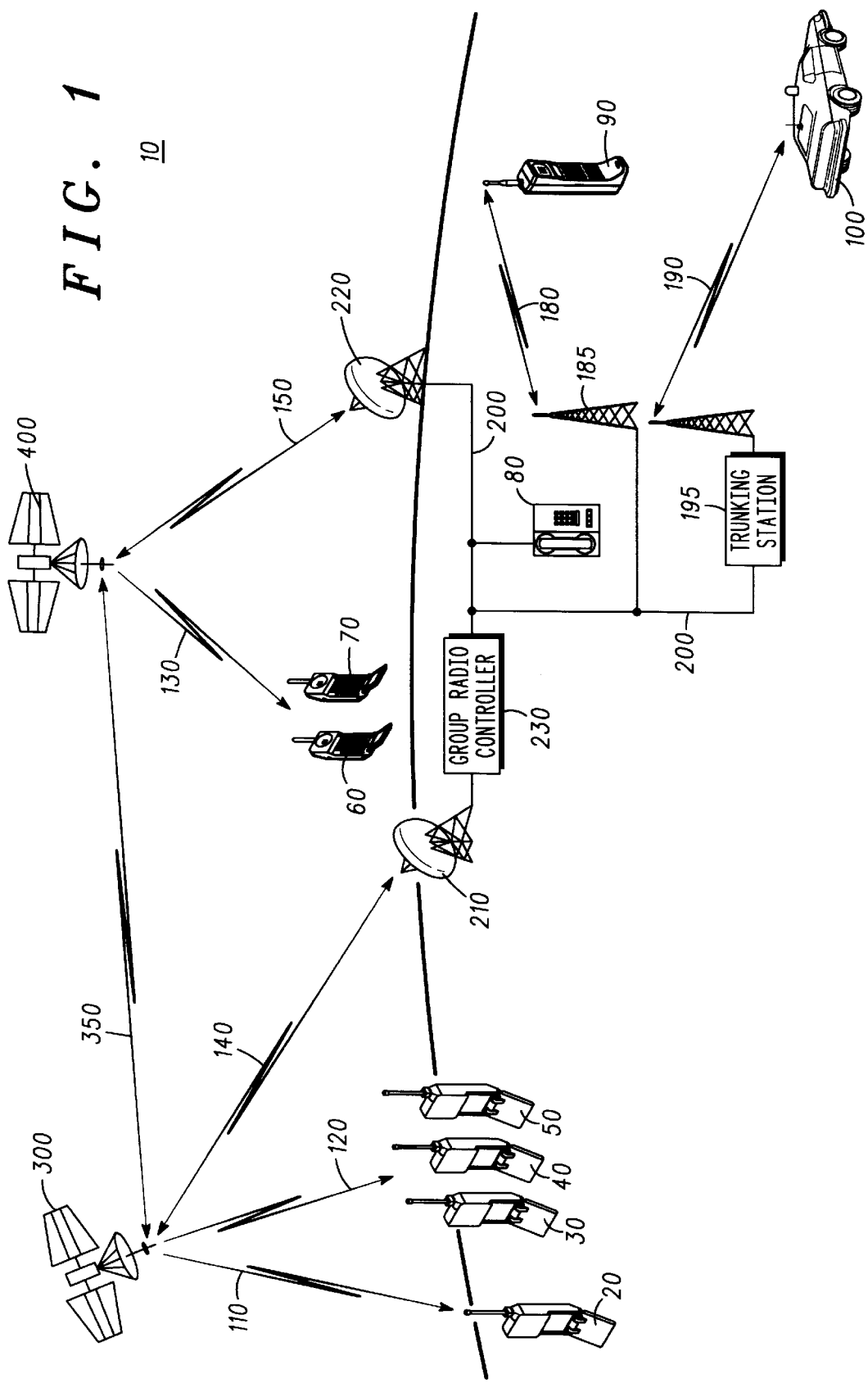
FIG. 1 illustrates a satellite based group radio system in accordance with a preferred embodiment of the present invention.

FIG. 1 illustrates satellite-based group radio system 10 according to a preferred embodiment of the present invention. As shown in FIG. 1, remote unit 20 is in radio communication with satellite 300 via satellite channel 110. Similarly, remote units 30, 40, and 50 are also in communication with satellite 300 via satellite channel 120. Remote units 60 and 70 are in radio communication with satellite 400 via satellite channel 130. In the preferred embodiment remote units 20 through 70 are used by entities that need a connection to a group channel. For example, remote units 20 through 70 could be used by rescue units operating in sparsely populated areas using satellite cellular telephones to communicate with each other and with other remote units. The remote units may also be dual mode cellular telephones which can transmit to and receive from terrestrial cellular stations. Remote units 20 through 70 comprise at least a transceiver for receiving and transmitting messages which comprise analog voice, digitized voice, or binary data, and a processor for interpreting signaling information from the satellite so that frequency, time slot, or other communications channel assignments can be made. Remote units 20 through 70 may optionally include an encryption module to encrypt and de-encrypt messages. The transceiver, processor, and optional encryption and de-encryption module are well known to those of ordinary skill in the art as well as the hardware architecture coupling these elements.

Satellite 300 is in communication with gateway 210 via radio link 140. Similarly, satellite 400 is in radio communication with gateway 220 via radio link 150. Satellites 300 and 400 may be in communication with each other through satellite cross-link 350. Satellites 300 and 400 provide a communication link between individual remote units and the terrestrial gateways and may also be in communication with other users who are not remote units sharing a group channel. Satellites 300 and 400 are preferably in a low-earth orbit, but the present invention is applicable to any communication satellite system that provides adequate earth coverage that is capable of multichannel message reception and transmission including the IRIDIUM® system. Other types of communication satellites can be used including those that employ repeater or "bent pipe" modes, Satellites 300 and 400 could also be in either a medium-earth or geosynchronous orbit. The only requirement for satellites 300 and 400 is that the radio frequency signal characteristics are adequate to support communications with handheld or portable remote units which have omnidirectional or directional antennas. How satellites 300 and 400 physically transmit the signals to and receive signals from the remote units and the gateway is well known to those of ordinary skill in the art.

Gateways 210 and 220 couple to a wireline switched telephone network (WSTN) 200. Gateways are typically earth-based facilities that are capable of communicating with satellites such as 300 and 400. Although gateways 210 and 220 are illustrated as having only a single antenna, each gateway may employ more that one antenna so as to provide communications with more than one satellite at any one time. The only requirements for gateways 210 and 220 are that they receive messages from a satellite and transmit these to WSTN 200 and that they receive messages from WSTN 200 and transmit these to a satellite. How the gateways physically receive information from the satellites and transmit this along WSTN 200 as well as how the gateways receive information from the WSTN 200 and transmit this to the satellites is well know to those of ordinary skill in the art.

WSTN 200 can be any telephone network that provides connectivity between a wide range of users. For example, WSTN 200 can be the Public Switched Telephone Network (PSTN). Alternatively, WSTN 200 can be a cellular backbone used to interconnect cellular base stations, base station controllers, and mobile switching centers within a cellular network. In a military group radio application, WSTN 200 can be the Defense Information System Network which provides equivalent PSTN service between military users. The only requirement of WSTN 200 is that it provide the switching, routing, and addressing to enable users to communicate with each other through direct dialing. The means by which these are accomplished are well known to those of ordinary skill in the art.

Remote unit 90 connects to WSTN 200 through terrestrial cellular telephone antenna site 185 using radio link 180. Remote unit 90 could be any cellular telephone connected to a group channel. For example, remote unit 90 could be in use by a police unit traveling to a staging area within a city. The host network providing the terrestrial cellular telephone service to remote unit 90 can be of any type and use any analog or digital format such as frequency division multiple access (FDMA), time domain multiple access (TDMA), or code division multiple access (CDMA). Remote unit 90 comprises at least a transceiver for receiving and transmitting messages, and a processor for interpreting signaling information host network so that frequency, time slot, or other communications channel assignments can be made. Remote unit 90 may optionally include an encryption module to encrypt and de-encrypt messages. The transceiver, processor, and optional encryption and de-encryption module are well known to those of ordinary skill in the art as well as the hardware architecture coupling these elements.

Cellular telephone antenna site 185 can also be of any type. The antenna may be placed on a building or as a stand-alone tower. The only requirement of antenna site 185 is that it be capable of establishing a radio link to a cellular telephone such that messages from WSTN 200 can be transmitted to a cellular telephone and that messages from a cellular telephone can be transmitted along WSTN 200. How the cellular telephone antenna site physically receives information from the remote unit and transmits this along WSTN 200 as well as how the site receives information from WSTN 200 and transmits this to the remote unit is well known to those of ordinary skill in the art.

Remote unit 100 is a trunked radio unit which has established a temporary connection (patch) to WSTN 200 through radio link 190 to trunking station 195. Remote unit 100 can be any unit in a trunked radio system such as the type used by various police, fire, and other government entities. Remote unit 100 may optionally include an encryption module to encrypt and de-encrypt messages. Remote unit 100 is comprised of a transceiver for receiving and transmitting messages, a processor for interpreting signaling information from the trunking station, and an optional encryption module so that frequency, time slot, or other communications channel assignments can be made.

Trunking station 195 receives radio signals from remote unit 100 and patches these through to WSTN 200. Similarly, the trunking station also patches information from WSTN 200 through to remote user 100. The manner in which information is patched to and from WSTN 200 is well known to those of ordinary skill in the art.

Remote unit 80 is an wireline telephone device which maintains a direct connection to WSTN 200. The telephone device could be an ordinary analog rotary or touch-tone telephone, or could be a digital device such as modem or telefax machine. The telephone device may also employ an encryption module to encrypt and de-encrypt messages. The telephone device performs the normal functions of transmitting and receiving messages to and from a WSTN 200. This process is well known to those of ordinary skill in the art.

The group radio controller (GRC) 230 is coupled to WSTN 200 in order to receive messages from remote units 20 through 100. As previously described, all message traffic that originates from remote units 20 through 100 couples either directly or indirectly to WSTN 200. GRC 230 is the receiver of all traffic from the remote units which share the group channel. When message transmissions are received from any remote unit in the group via WSTN 200, GRC 230 transmits the message to the other remote units in the group. This process is referred to as "repeating". In the preferred embodiment, the GRC repeats messages from any remote unit to the other remote units.

GRC 230 also controls the access to a group channel. In a military application, for example, GRC 230 may be programmed to require each remote unit to enter an authentication code before access to the group channel is permitted. GRC 230 may also record the time that each remote unit is connected to the group channel as an input to the customer billing system.

Another function of GRC 230 may include the notification of remote units preassigned to a specific group that activity on the group channel is beginning. This feature is particularly useful during operations where remote units are spread across the earth and some units are required to be apprised of group activities regardless of the time of day. This notification can take the form of a page, automated phone call or message from GRC 230.

Further functionality of GRC 230 is to track the locations of those remote units which are using satellite cellular or terrestrial cellular telephones and to assign the "anchor radio" function to individual cellular remote units. The concept of the anchor radio is described in the next section. GRC 230 comprises an interface to WSTN 200 which facilitates connections to numerous remote units. GRC 230 additionally comprises a processor and memory which serve to control access to the group channel, generate paging and automated messaging information, manage the status of the "anchor" radios, and control the repeater function. The interface to WSTN 200, the processor, and memory as well as the hardware architecture coupling the elements are well known to those of ordinary skill in the art.

Anchor Radio Concept

Under non-group radio conditions, when a satellite cellular telephone user is receiving messages from another user, the satellite is illuminating the user's geographical area with a beam of radiated energy. The beam may be shared through the use of a unique frequency (in an FDMA system), or time slot (in a TDMA system), or may use some other method of uniquely identifying the transmission which may be known to those of ordinary skill in the art such as employing a unique spreading code in a CDMA system. Each of the unique divisions within a beam are referred to as satellite channels. The satellite radiates a unique channel for each cellular telephone user of the satellite system engaged in a call. In a system such as IRIDIUM®, a beam can cover an area hundreds of miles wide.

In this invention, an "anchor" radio is used to ensure that the satellite maintains a channel for the geographical area where a group of satellite cellular remote units are present. Thus, the satellite system need only radiate a single channel for multiple remote units. In this invention, one remote unit is assigned to anchor the satellite channel to the earth and perform the link maintenance functions while other remote units in the area listen to the channel. The link maintenance function is required since the satellite cellular system will typically close the satellite channel to a remote unit after the unit has not transmitted for a period of time in order to make the channel resources available to other users. Thus, the anchor radio must periodically or randomly transmit a burst of radio frequency energy in order for the satellite to maintain the channel. The user of the remote unit is usually unaware of the link maintenance process.

Once a single anchor has been established for a given geographical area, an unlimited number of remote units in the area can access the group channel. This reduces the system resources required to support the group since only a single satellite channel is used for multiple remote units. Accordingly, the cost to the group is reduced.

In this invention, an anchor radio is used to reduce the cost to terrestrial cellular telephone remote units as well. In a terrestrial system, each non-group radio user is assigned a unique frequency (in an FDMA system), or time slot (in a TDMA system), or may use some other method of uniquely identifying the transmission which may be known to those of ordinary skill in the art such as employing a unique spreading code in a code division multiple access (CDMA) system. The host terrestrial antenna site maintains a channel for each cellular telephone engaged in call. A terrestrial cellular site can cover hundreds of square miles depending on the terrain.

In this invention, an anchor radio is used to ensure that the cellular system maintains a host channel for the other terrestrial cellular remote units. Thus, the terrestrial system need only radiate on a single host channel for multiple remote units. In this invention, one remote unit is assigned to anchor the host channel and perform the link maintenance functions while other remote units in the area need only listen to the host channel. The link maintenance function is required since the host terrestrial cellular system will typically close the channel after the remote unit has not transmitted for a period of time in order to make the channel resources available to other users. Thus, the anchor radio must periodically or randomly transmit a burst of radio frequency energy in order for the cellular antenna site to maintain the host channel. The user of the remote unit is usually unaware of the link maintenance bursts.

Once a single anchor has been established for a given area, an unlimited number of remote units can access the cellular host channel. This reduces the system resources required to support the group since only a single host channel is used for multiple remote units. Accordingly, the cost to the group is reduced.

In this invention, the anchor radio is selected by GRC 230 based on its location and the relative locations of the other remote units, although GRC 230 may select an anchor radio based on other criteria. For example, in a group radio system for use by a statewide police department, an anchor radio may be established for the satellite cellular system remote units. In this case, the anchor radio may permanently be located in the middle of the state. Thus, the satellite cellular telephone remote units can always share this channel and be assured statewide coverage for the other remote units of this type.

In FIG. 1, GRC 230 determines which radios will perform the anchor radio function. In a satellite-based communications system, GRC 230 may assign and reassign anchor radios many times throughout the duration of the group radio session. This may be due to the movement of the satellite relative to the individual remote units, or due to a remote unit anchor radio needing to disconnect from the group channel. In either case, the anchor radio function can be assigned to another radio in the same geographical area. If all remote units in a geographical area have disconnected from the group radio channel, the satellite channel for that area can be terminated. This allows the group radio channel to remain open using the minimum amount of satellite resources.

In FIG. 1, suppose remote unit 20 is the anchor radio for satellite channel 110 and remote unit 50 is the anchor radio for satellite channel 120. If the relative motion of the satellite causes remote units 20, 30, 40, and 50 to be illuminated by a single satellite channel, GRC 230 can deassign the anchor radio function from either remote unit 20 or 50 and assign these remote units as well as 30 and 40 to the same satellite channel. As the motion of the satellite continues such that the remote units 20, 30, 40, and 50 can no longer be illuminated by a single satellite channel, GRC 230 will reassign a remote unit as an anchor radio for another satellite channel. The GRC may also assign other remote units to follow the anchor radio to the new frequency, time, or code slot corresponding to the new satellite channel.

The concept of the anchor radio for terrestrial cellular remote units can also be illustrated FIG. 1 as well. In FIG. 1, remote unit 90 is the only terrestrial cellular telephone in the group. As such, GRC 230 automatically assigns remote unit 90 to perform the anchor radio function for host cellular antenna site 185. If another remote unit within range of antenna site 185 needs to connect to the group channel, GRC 230 can allow the unit to share the host channel. Then, if remote unit 185 selects to disconnect from the group channel, GRC 230 can assign the new remote unit to perform the anchor radio function for the host channel. Other functions of the GRC are described in the next section.

It should be noted that the anchor radio concept does not apply to wireline telephone remote unit 80 nor trunked radio remote unit 100. For the case of a wireline telephone unit, a dedicated host channel is maintained while each remote unit is connected to the group channel. A WSTN provides no simple means for sharing a host channel. In the case of the trunked radio system remote unit 100, the trunking system already provides a host channel for sharing by other remote units of this type.

Remote Unit Registration with Group Radio Controller

Figure 2:
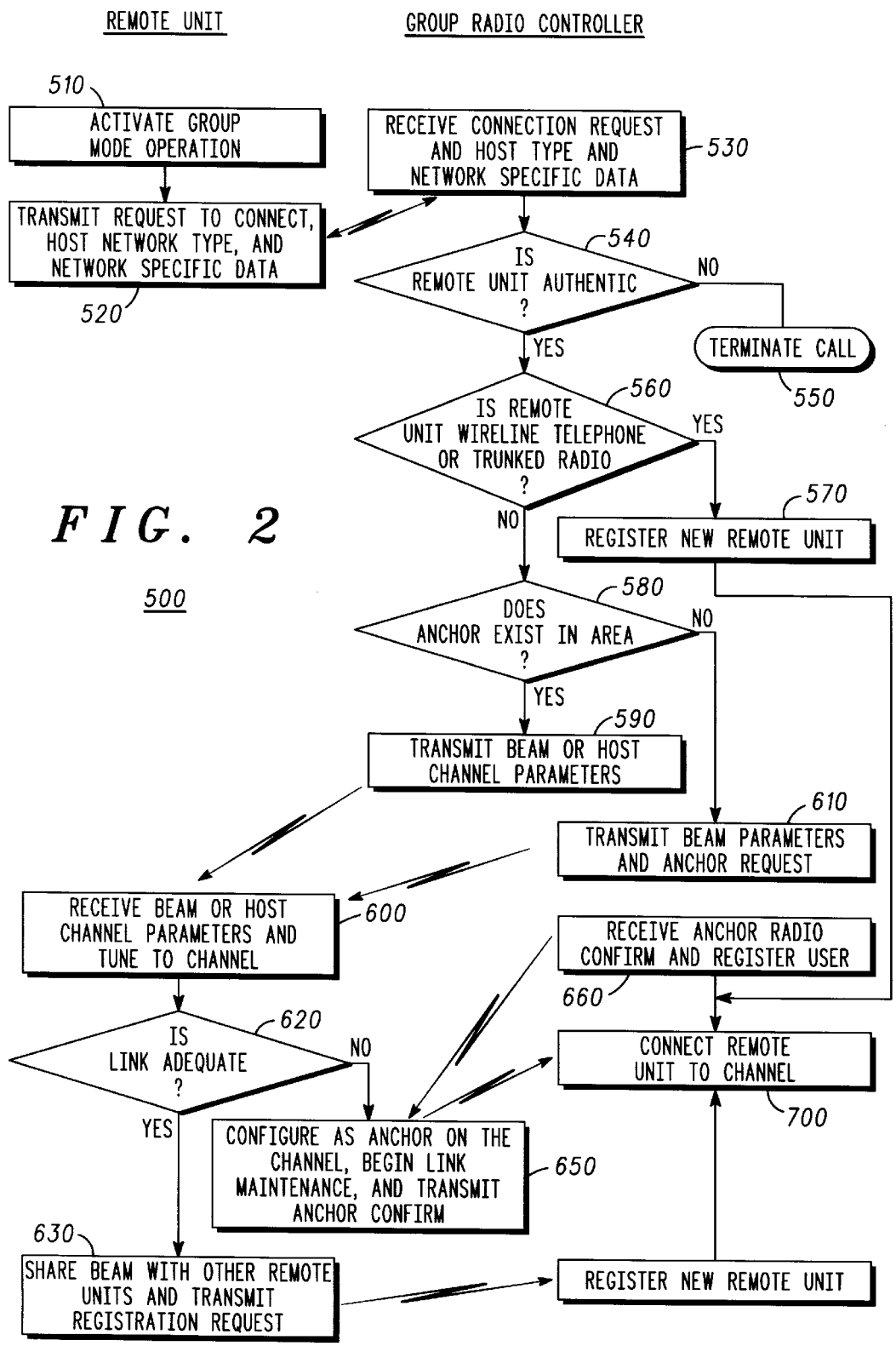
FIG. 2 shows a method by which a remote unit is added to a group channel in accordance with a preferred embodiment of the present invention.

FIG. 2 shows method 500 by which a new member is added to a group channel in accordance with the preferred embodiment of the present invention. This method shows the exchange that takes place between an individual remote unit and the GRC.

The process begins with step 510 when the radio is activated for group mode operation. In the preferred embodiment, the remote unit places a standard telephone call through the appropriate host network (satellite cellular, terrestrial cellular, or terrestrial wireline) to a designated group telephone number. In the case of a trunked radio system unit, the call may be placed by an operator at the interface between the trunk station and a WSTN.

Step 510 can occur in response to a page or automated phone call to a preassigned remote unit which indicates that other remote units have begun accessing the group channel.

Upon connection with the GRC, the remote unit transmits in step 520 a request to connect with a specific group. The GRC then transmits a request for host network identification to the remote unit. In turn, the remote unit can transmit an indicator of the host network type, and an identifier. In the case of a wireline telephone, the identifier may simply be the phone number of the caller. For the case of a satellite or terrestrial cellular unit, additional network-specific information is exchanged such as the geographical location of the remote unit and satellite channel or terrestrial host channel parameters.

When the GRC receives in step 530 the host network type, identifier, and other network specific data from the remote unit, it may optionally request authentication from the remote unit. In a military application for example, this could take the form or a word-of-the-day or other code word.

If the remote unit cannot be authenticated in step 540, the GRC terminates the call in step 550. If the unit can be authenticated in step 540, the GRC decides in step 560 whether the remote unit is a wireline telephone or trunked radio system user based on the host network type. In the case of a terrestrial wireline telephone, the GRC can register in step 570 the remote unit as a group member immediately and connect the new remote unit to the group channel in step 700 thus completing the connection process. If the remote unit is not a wireline telephone or trunked radio user, the GRC then begins to process the user as a terrestrial or satellite cellular telephone remote unit and determines in step 580 if the unit can connect to an existing anchor channel. If an anchor radio remote unit is present in the area of the new remote unit, the GRC transmits in step 590 the parameters of the terrestrial host channel or the satellite channel to the new remote unit. If an anchor radio does not exist in the area of the remote unit, the GRC transmits in step 610 the channel information for a new anchor channel that will be created by the host network.

If the anchor radio remote unit is in the area of the new remote unit, in step 600, the remote unit receives the parameters for the satellite channel or terrestrial host channel in which an anchor currently exists and switches to the assigned channel. The remote unit then measures in step 620 the signal strength on the channel and determines if the link is adequate. If the signal strength is adequate, the remote unit shares the channel with any other remote units sharing the satellite channel or terrestrial host channel and transmits in step 630 a registration request to the GRC. The GRC then registers in step 640 the remote unit and connects in step 700 the unit to the group channel.

If, however, the link measurement indicates in step 620 that the signal strength is not adequate, the remote unit configures itself in step 650 as an anchor radio on the channel.

A remote unit will configure itself as an anchor directly in step 610 if requested to do so by the GRC. In this case, the GRC has prior knowledge of the presence of an anchor radio remote unit in the area of the new remote unit.

After the remote unit has configured itself as an anchor, either as the result of an anchor request as in step 610, or as the result of a link measurement in step 620, the unit transmits an anchor confirm in step 650 to the GRC. When the anchor confirm message is received, the GRC registers the remote unit in step 660 and connects in step 700 the remote unit to the group channel. From this point onward, all transmissions from the new remote unit are routed to all other remote units of the group. Additionally, transmissions from all other remote units are routed to the new remote unit.

Remote Unit Management by Group Radio Controller

After all remote units have registered, the primary role of the GRC is to manage the communication links established by the satellite and terrestrial cellular telephone remote units.

For the satellite cellular telephone users, it essential that the remote units periodically monitor the satellite to ground link. If the quality of the link degrades significantly, the radio transmits a connection request to the GRC as described in FIG. 2. The exchange between the GRC and the radio is identical to that described in FIG. 2. The purpose of the connection request is for the GRC to establish a higher quality communications link between the remote unit and the group channel. The exchange may result in the remote unit being assigned as an anchor radio.

Alternatively, the GRC may determine that a particular anchor radio is no longer needed. This could arise due to a spreading of the antenna beam from the satellite or from a set of satellite or terrestrial cellular telephone remote units converging on a single point. In either case, the GRC will send an anchor reject to the remote unit along with new terrestrial host channel or satellite channel information to enable the radio to connect with the GRC as a new remote unit. Upon switching to the new channel, the remote unit will transmit a registration request to the GRC on the new channel.

Remote Unit Termination from Group Channel

Figure 3:
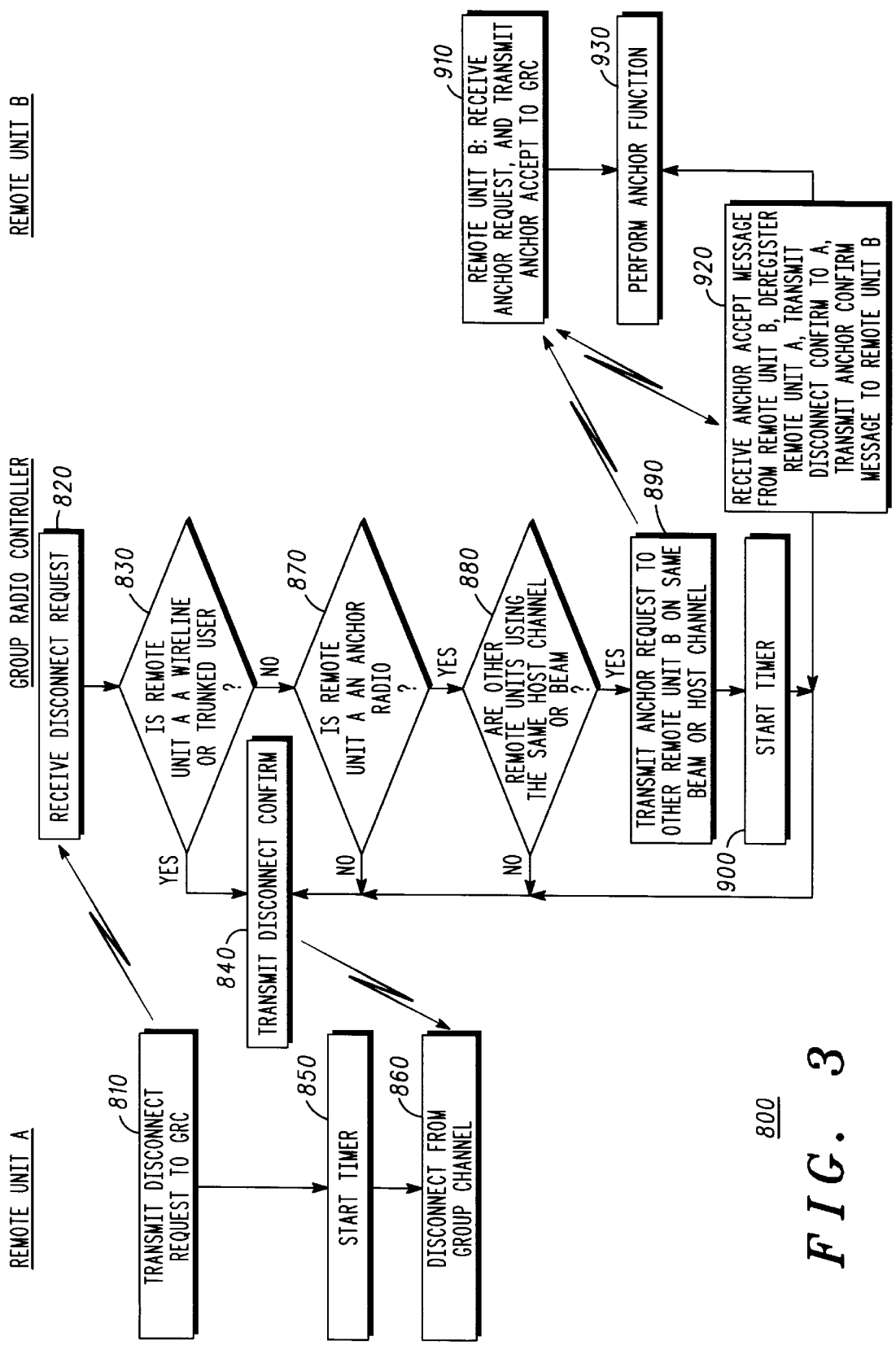
FIG. 3 shows a method by which a remote unit exits a group channel in accordance with the preferred embodiment of the present invention.

FIG. 3 shows a method 800 by which a remote unit disconnects from a group channel in accordance with the preferred embodiment. The process begins by remote unit A transmitting a disconnect request to the GRC as in step 810. When the GRC receives the disconnection request as in step 820, it must first determine what type of remote is unit making the request. If the request is from a wireline telephone or trunked radio system remote unit as in step 830, the GRC transmits a disconnect confirm code as in step 840 to remote unit A and then deregisters remote unit A when the user hangs up the telephone or otherwise terminates the call in step 860. A trunked radio system remote unit may terminate from the group channel in the same manner. For both types of wireline remote units, the timer setting in step 850 is optional.

If remote unit A requesting disconnection from the group is a satellite or terrestrial cellular user, remote unit A starts the timer in step 850 immediately upon sending the request to disconnect. For cellular remote units, the purpose of the timer is to allow remote unit A to disconnect in a timely fashion in the absence of further instructions from the GRC. However, if remote unit A is an anchor radio, the GRC must ensure that the anchor radio role is transferred to another remote unit, such as remote unit B in FIG. 3.

If remote unit A is not an anchor radio in step 870, it is deregistered in step 840 and disconnected from the group in step 860. If remote unit A is an anchor radio, the GRC must determine if any other remote units are sharing the same satellite channel, or the same terrestrial cellular host channel in step 880. If there are no other remote units sharing the same satellite channel or terrestrial host channel, then there is no need to ensure that a new anchor is assigned. In this case, the remote unit A can be deregistered and disconnected from the group in steps 840 and 860.

If remote unit A is an anchor, and there are other remote units sharing the satellite channel orterrestrial host channel, then the GRC must ensure that a new anchor is designated as in step 890. In this event, the GRC transmits a new anchor request to remote unit B which is sharing the satellite channel or terrestrial host channel. At the same time, the GRC sets a timer in step 900 according to the length of time that it will force remote unit A to wait before allowing remote unit A to disconnect.

When the selected radio, remote unit B, receives the anchor request, an anchor accept message is generated and transmitted in step 910 to the GRC. When the GRC receives the anchor accept message from remote unit B, it deregisters remote unit A, and transmits a disconnect confirm message to remote unit A in step 920. Additionally, the GRC transmits an anchor confirm message to remote unit B also in step 920. When remote unit B receives anchor confirm message from the GRC, it begins to perform the anchor function in step 930.

Alternatively, the GRC may transmit the anchor request to more than one remote unit in step 890. In this case, some or all of the remote units may be capable of performing the anchor radio function. Accordingly, each remote unit transmits the anchor accept message in step 910 to the GRC. The GRC then determines the best candidate to perform the anchor radio function and transmits an anchor confirm message in step 920. The selected remote unit then performs the anchor function in step 930 only after receiving the anchor confirm from the GRC.

Alternate Embodiments of Group Radio Controller

For many current and near term group radio applications, it logical to place the GRC within a WSTN infrastructure. Since all cellular and most trunked radio systems maintain an interface to this common network, the widest range of remote units can be accommodated through either a direct or indirect connection to a WSTN. In a system such as that described in the primary embodiment of this invention, it is desirable to place the GRC closest to the greatest concentration of remote units. As the GRC is placed closer to the greatest concentration of remote units, the average path length through the communication network is reduced thereby reducing the demand on system resources. For example, if all remote units in the group are satellite cellular telephones, then each transmission from any of the satellite cellular remote units must be routed through the satellite network and through a WSTN to a GRC. At the GRC, the transmission must be repeated and sent back through the satellite network to the remote units.

Figure 4:
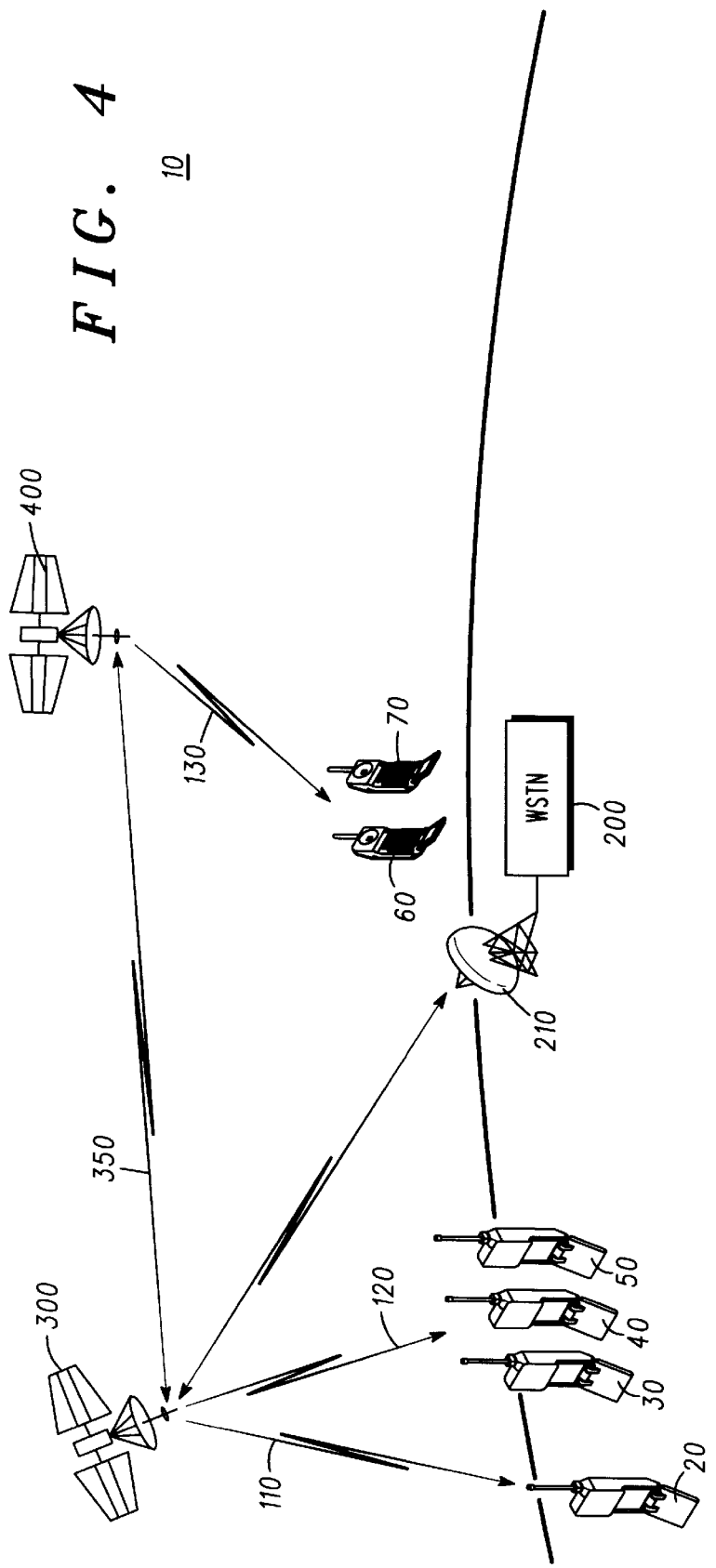
FIG. 4 shows an alternate embodiment in which the group radio controller function is performed by a satellite telephony system.

An example 10 of this is illustrated in FIG. 4. With the group comprised only of remote units 20, 30, 40, and 50, it is most efficient to incorporate the GRC functionality into satellite 300. In this case, the messages from remote unit 20 would be repeated by satellite 300 to remote units 30, 40, and 50.

With remote units 60 and 70 being added to the group channel, it is most efficient to spread the GRC repeating function over satellites 300 and 400. In this case, satellite 300 concentrates all transmissions from remote units 20, 30, 40, and 50 into bi-directional satellite cross link 350. Similarly, satellite 400 concentrates transmissions from remote units 60 and 70 into satellite crosslink 350.

Alternatively, the GRC repeating function may be performed within a satellite gateway 210. In this case, the audio or data streams from units 60 and 70 are cross linked to satellite 300 through cross link 350. At satellite 300, the message streams from remote units 20 through 50 are concentrated and down linked to terrestrial gateway 210. At gateway 210 all message streams are concentrated into a single stream and interfaced to potential other group members through WSTN 200.

Figure 5:
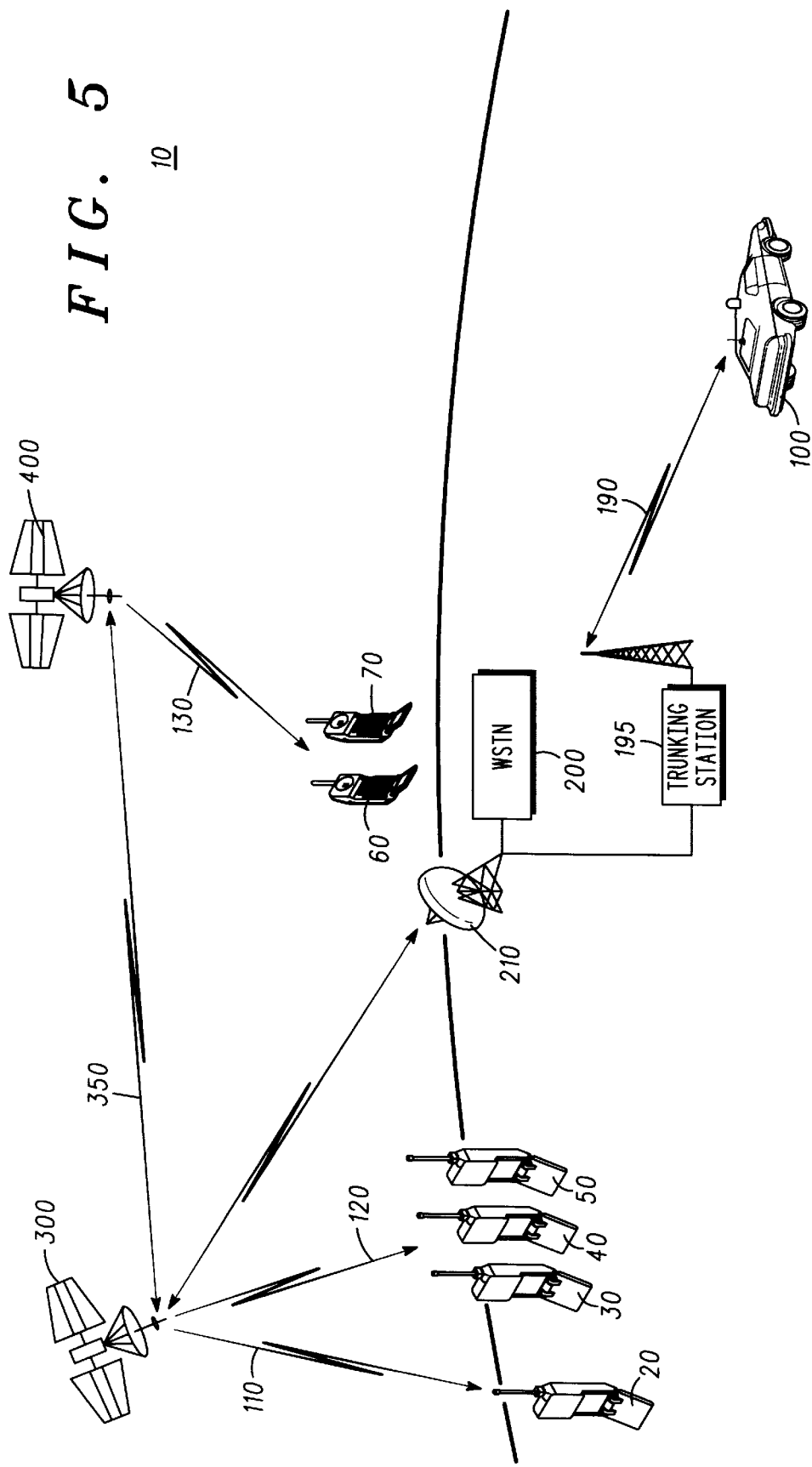
FIG. 5 shows another alternate embodiment in which the group radio controller function is performed by a trunking station.

Another alternative, is to perform the GRC function within a trunking station as shown in FIG. 5. For example, suppose a flood or other natural disaster has damaged WSTN 200. Under these circumstances, it is likely that most remote units will be police and rescue units providing emergency services. Thus, the most efficient and reliable group radio service would result in locating GRC 230 within trunking station 195.

It will be appreciated by those skilled in the art that the present invention satisfies a significant need for a group radio capability without modification to the existing telephony infrastructure. It can also be appreciated that for group radio applications, where most or all group members are satellite cellular telephone users, greater efficiency can be achieved by performing group radio controller functions within the satellite system. Additionally, the incorporation of the group radio controller into a trunking station can provide the most reliable service when the remote units consist of satellite cellular users and trunked radio users.

Accordingly, it is intended by the appended claims to cover all modifications of the invention that fall within the true spirit and scope of the invention.

What is claimed is:

1. A group radio system, comprising:
   a plurality of remote units;
   a wireline switched telephone network; and
   a group radio controller connected to the wireline switched telephone network which receives messages from one of the plurality of remote units and repeats the messages to the plurality of remote units by way of a group channel, wherein the one of the plurality of remote units is a cellular telephone which communicates with the wireline switched telephone network by way of a cellular network, and wherein the one of the plurality of remote units is an anchor radio which transmits energy to the cellular network, thereby allowing the plurality of remote units to receive from a single channel of the cellular network.

2. A group radio system as recited in claim 1, wherein the one of the plurality of remote units is a satellite cellular telephone which is able to communicate with the wireline switched telephone network by way of a satellite cellular network.

3. A group radio system as recited in claim 1, wherein the one of the plurality of remote units is a terrestrial cellular telephone which is able to communicate with the wireline switched telephone network by way of a terrestrial cellular host channel.

4. A group radio system as recited in claim 1, wherein one of the plurality of remote units is a wireline telephone directly connected to the wireline switched telephone network.

5. A group radio system as recited in claim 1, wherein one of the plurality remote units is a trunked radio user patched to the wireline switched telephone network through a trunking station.

6. A group radio system as recited in claim 1, wherein the group radio controller controls access of a remote unit to the group channel.

7. A group radio system as recited in claim 1, wherein the group radio controller manages group channels for groups of remote units.

8. A group radio system as recited in claim 1, wherein the group radio controller registers a remote unit when the remote unit connects to the group channel.

9. A group radio system as recited in claim 1, wherein the group radio controller deregisters a remote unit when the remote unit disconnects from the group channel.

10. A group radio system as recited in claim 1, wherein the group radio controller assigns a remote unit to perform as an anchor radio.

11. A group radio system as recited in claim 1, wherein the group radio controller deassigns an anchor radio from the group channel and assigns another remote unit to be an anchor radio.

12. A group radio system as recited in claim 1, wherein the group radio controller is connected to a satellite-based cellular telephone network.

13. A group radio system as recited in claim 12, wherein the satellite-based cellular telephone network comprises satellites that move in non-geosynchronous orbits.

14. A group radio system as recited in claim 1, wherein the group radio controller is connected to a trunking station.

15. A method of connecting a plurality of remote units to a group channel, comprising the steps of:
   a) the plurality of remote units each transmitting an identifier through a telephone network to a group radio controller;
   b) the group radio controller creating at least one group channel which connects the plurality of remote units together; and
   c) the group radio controller assigning a remote unit to be an anchor radio, wherein the anchor radio communicates with a wireline switched telephone network by way of a cellular network, and wherein the anchor radio transmits energy to the cellular network, thereby allowing the plurality of remote units to receive from a single channel of the cellular network.

16. The method of claim 15, wherein step (a) comprises the step of the remote units each transmitting a geographic location to the group radio controller.

17. The method of claim 15, wherein step (a) comprises the step of transmitting information regarding a host network with which the remote unit is communicating to the group radio controller.

18. The method of claim 15, wherein step (a) comprises the step of transmitting an authentication code to the group radio controller.

19. The method of claim 15, wherein step (b) comprises the step of the group radio controller creating separate channels for remote unit receive and remote unit transmit.

20. The method of claim 15, wherein step (b) comprises the step of the group radio controller transmitting a message to a preassigned remote unit indicating activity on a group channel.

21. A method of maintaining a group channel, comprising the steps of:
   a) a first remote unit transmitting a disconnect request to a group radio controller;
   b) the group radio controller assigning a second remote unit to be an anchor radio if the first remote unit is an anchor radio; and
   c) the second remote unit transmitting an anchor accept message to the group radio controller.

22. The method of claim 21, wherein step (a) comprises the step of the first remote unit setting a timer and disconnecting from a group channel after a period of time.

23. The method of claim 21, wherein step (b) comprises the step of the group radio controller determining a satellite channel which the first remote unit is using to communicate.

24. The method of claim 21, wherein step (b) comprises the step of the group radio controller determining a host channel which the first remote unit is using to communicate.

25. The method claim 21, wherein step (b) comprises the step of the group radio controller setting a timer which limits a period of time that an anchor radio waits before disconnecting from the group channel.

26. The method of claim 21, wherein step (b) comprises the step of the group radio controller assigning the anchor radio function in response to multiple remote units transmitting an anchor accept message.

27. A method of maintaining a group channel, comprising the steps of:
   a) a first remote unit transmitting a disconnect request to a group radio controller;
   b) the group radio controller assigning a second remote unit to be an anchor radio if the first remote unit is an anchor radio; and
   c) the group radio controller assigning the anchor radio function in response to multiple remote units transmitting an anchor accept message.

28. The method of claim 27, wherein step (a) comprises the step of the first remote unit setting a timer and disconnecting from a group channel after a period of time.

29. The method of claim 27, wherein step (b) comprises the step of the group radio controller determining a satellite channel which the first remote unit is using to communicate.

30. The method of claim 27, wherein step (b) comprises the step of the group radio controller determining a host channel which the first remote unit is using to communicate.

31. The method of claim 27, wherein step (b) comprises the step of the second remote unit transmitting an anchor accept message to the group radio controller.

32. The method claim 27, wherein step (b) comprises the step of the group radio controller setting a timer which limits a period of time that an anchor radio waits before disconnecting from the group channel.

* * * * *